UNITED STATES PATENT OFFICE.

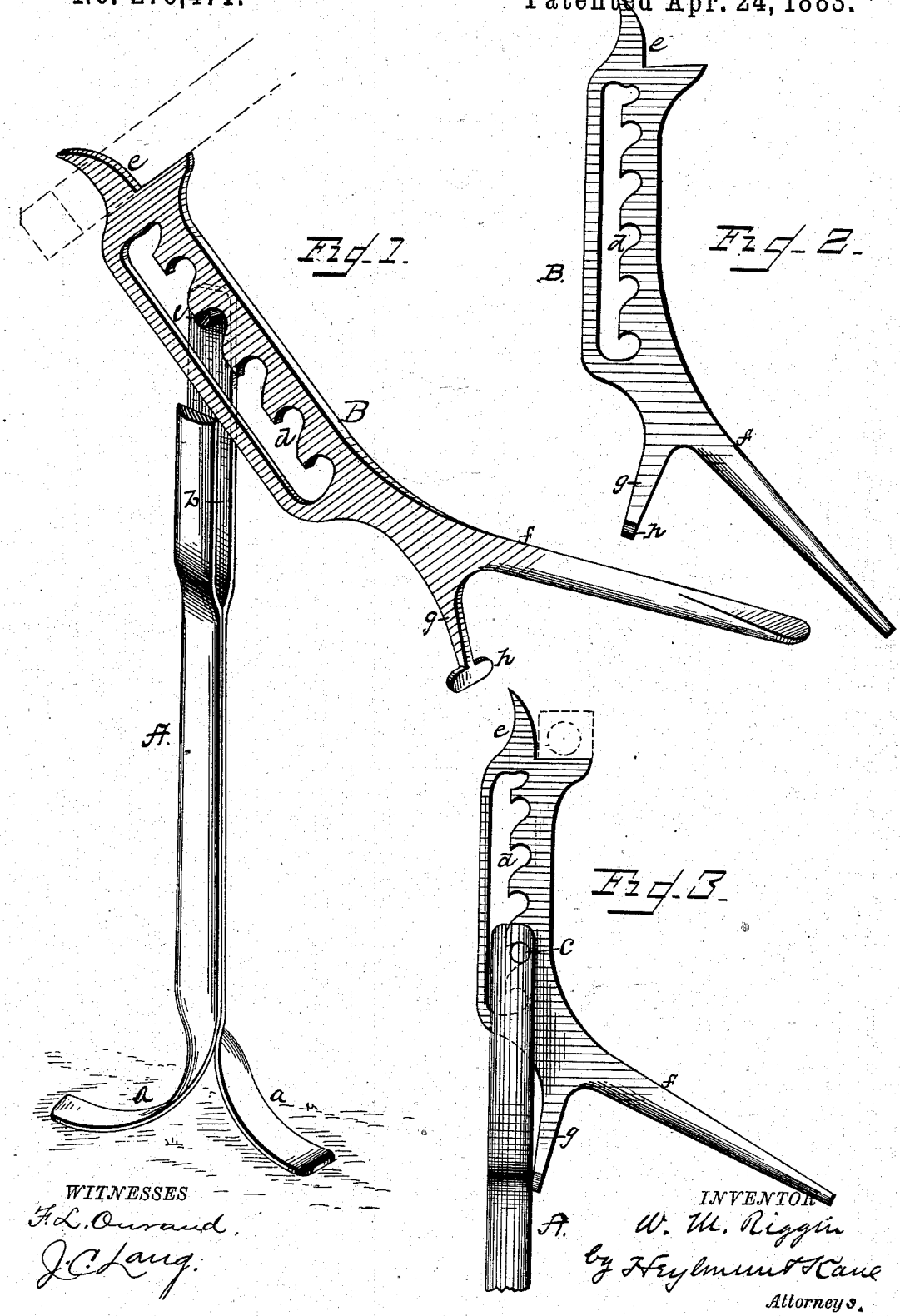

WILLIAM M. RIGGIN, OF MADISONVILLE, KENTUCKY, ASSIGNOR OF ONE-HALF TO T. B. JONES, OF SAME PLACE.

LIFTING-JACK.

SPECIFICATION forming part of Letters Patent No. 276,471, dated April 24, 1883.

Application filed March 16, 1883. (No model.)

*To all whom it may concern:*

Be it known that I, WILLIAM M. RIGGIN, a citizen of the United States of America, residing at Madisonville, in the county of Hopkins and State of Kentucky, have invented certain new and useful Improvements in Lifting-Jacks; and I do hereby declare the following to be a full, clear, and exact description of the invention, such as will enable others skilled in the art to which it appertains to make and use the same.

This invention has relation to improvements in lifting-jacks of that class applicable for use in lifting the axles of wagons and similar objects.

The object of my invention is to construct a lifting-jack of the class named, which, being adjusted and applied to the purposes intended, will, when the weight is raised to a desired height, be positively sustained and maintained in place by the peculiar relation and position of parts without the intervention of loops, ratchets, and pawls, or other auxiliary fastening means.

My invention therefore consists in the novel construction and combination of parts, as will hereinafter be more fully described and specifically claimed.

In the accompanying drawings, forming a part of this specification, Figure 1 is a side view of the lifting-jack, showing my improvements ready to be applied to an axle of a wagon. Fig. 2 is a side view of the lever. Fig. 3 is a view showing the implement applied to an axle of a wagon and the lever drawn down until it is in a self-sustaining position.

The letter A represents the standard, made preferably of metal and formed or provided with the base-supports *a*, of any suitable structure, and also formed with the two side pieces, *b*, having a space between them wide enough and large enough to receive the body of the lever. The side pieces have formed in them at the upper ends perforations to receive the bolt *c*, on which the lifting-lever rests and swings.

The letter B is the lifting-lever, formed with the ratchet-slot *d*. This slot is made broad enough between the line of the straight bar and the line of ratchet-teeth to admit of the free passage of the pin or bolt in the top of the standard, in order that the lifting-lever may be adjusted to suit different heights. The ratchet-teeth are formed in scroll shape, so that they shall be given additional strength, and the lever shall rest securely on the bolt when raised perpendicularly. The claw *e* of the lifting-lever is preferably formed as shown in the drawings, but may be of any suitable shape to properly effect the purpose. The arm *f* of the lifting-lever may be of any suitable length, and has formed on it or suitably fixed thereto the arm *g*, placed intermediately between the ratchet and the end of the handle, and this arm *g* is formed with the cross-piece *h* on its end, and is so shaped and adjusted that the cross-piece being brought against the standard the weight and the direction of the pressure effected thereby shall be about on a line with the perpendicularity of the implement, but so that the line of pressure shall be just a little in front of the sustaining-bolt in the standard, in order that the tendency of pressure on the intermediate arm shall be strongly against the standard. This adjustment of parts, it will readily be seen, is such that the implement is kept securely in position by the weight of the object.

The adjustability of the implement is apparent to any one, and the advantages accruing from its construction are, that the weight is always applied in the line of the greatest strength—hence it may be made lighter in material—and also the fact that the weight is applied nearly or quite on a line with its perpendicularity. The base is thus broadened and its stability effectually assured when in position.

I reserve the right to slightly vary the construction of the device without departing from the spirit of the invention.

What I claim as my invention, and desire to secure by Letters Patent, is—

1. A lifting-lever formed with the ratchet-slot and intermediate arm, in combination with the standard, substantially as described.

2. The lifting-lever formed with the ratchet-slot having scroll-shaped ratchet, and the intermediate arm with cross-piece on the end, in combination with a suitable standard, substantially as described.

3. The lifting-jack herein described, consisting of the standard A, having the side extension, b, and the pivot pin or bolt c, the lifting-lever B, with slot d, claw e, arm f, and intermediate arm, g, with cross-piece h, the whole arranged and operating substantially as set forth.

In testimony whereof I affix my signature in presence of two witnesses.

WILLIAM MARK RIGGIN.

Witnesses:
THOS. W. GARDINER,
JOHN B. EARLE.